May 30, 1961 W. H. TORIAN 2,986,150
MEANS FOR MOUNTING THIN, FLEXIBLE MEMBRANES
Filed March 17, 1958
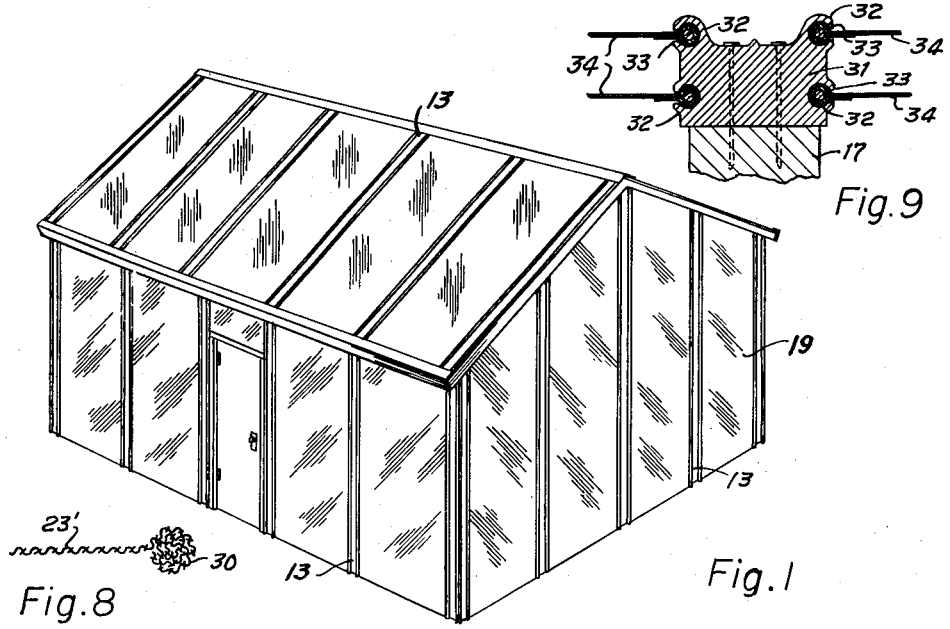
Fig. 9
Fig. 8
Fig. 1
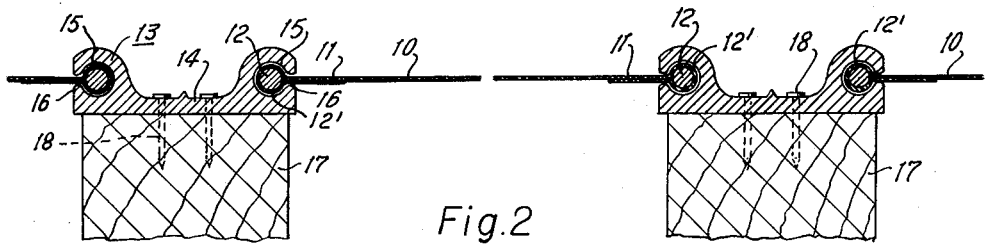
Fig. 2
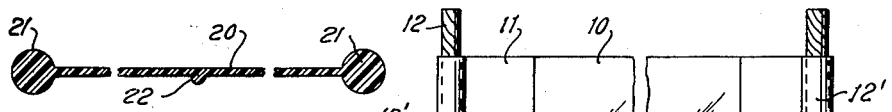
Fig. 4
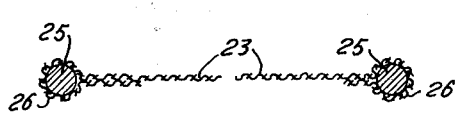
Fig. 5
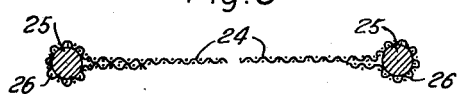
Fig. 6
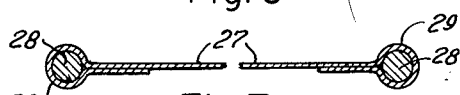
Fig. 7
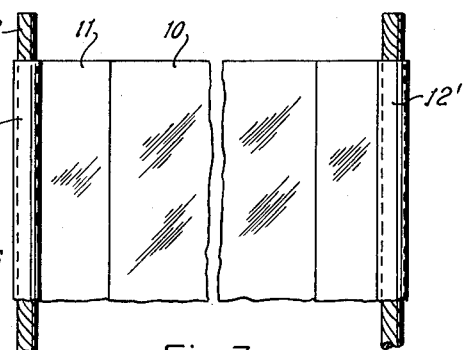
Fig. 3
INVENTOR
William Harold Torian
BY *Shley & Shley*
ATTORNEYS United States Patent Office 2,986,150
Patented May 30, 1961

2,986,150
MEANS FOR MOUNTING THIN, FLEXIBLE MEMBRANES
William Harold Torian, 326 Rio Grande National Bldg., Dallas, Tex.
Filed Mar. 17, 1958, Ser. No. 721,752
1 Claim. (Cl. 135—1)

This invention relates to new and useful improvements in means for mounting thin, flexible membranes.

The invention is particularly concerned with means for mounting wide and long panels or membranes of relatively thin and flexible material, such as thin plastic sheeting, thin metal panels, thin fabric or wire cloth panels, and the like, in such manner that the tendency of such panels to tear or part from the mounting or securing means is avoided.

There are numerous structures, devices, and articles of manufacture in which wide and long panels of relatively thin material must be carried upon a pair of spaced supports, and it is desirable that such mounting be secure against weather conditions, the hazards of normal or abnormal usage, and other increments of normal usage or wear and tear while still maintaining a durable and reliable mounting or fastening means. The invention will be described primarily with respect to its use in relatively small buildings, such as greenhouses and the like, but its use in other fields and other constructions will be readily apparent.

It has been discovered that in addition to the long-existing need for an inexpensive greenhouse structure, there is a need that the walls, and especially the roof sections, of such greenhouses shall be subject to quick and inexpensive replacement or substitution, either to repair weather damage, or more important, to substitute translucent panels of differing colors in accordance with the plants being grown or the growing season involved. There are instances in which one or more opaque or relatively opaque panels should be substituted for transparent or translucent panels, but it has also been determined that beneficial results can be obtained by substituting panels of differing colors or shades at various points in the growing life of a plant, and there is always the desirability of being able to replace quickly any panels or roof or wall sections which may have been damaged by wind or storm, or in some instances, by hail.

It is to be kept in mind, however, that the invention is not limited to greenhouse structures, but is applicable to other building structures and to numerous other constructions requiring the mounting of a wide and thin but quite long panel section.

It is, therefore, one object of this invention to provide an improved structure for the positioning and securing of wide and long panels of thin cross-section in which the edge portions of the panels are securely and uniformly held so as to distribute the securing stresses throughout the length or extent of the panel and thereby avoid the tendency toward tearing or parting of the panel at localized points of fastening.

An additional object of the invention is to provide a structure, of the character described, which lends itself readily to fabrication of various materials such as synthetic resins, fabric, wire cloth, paper, sheet metal, and the like.

Still another object of the invention is to provide a structure, of the character described, in which mounting members are provided into which the panels may readily be slipped for initial mounting or replacement with a minimum of labor and expenditure of time.

Yet another object of the invention is to provide a structure, of the character described, having novel drainage means for internal condensation of moisture whereby the dripping of such moisture from an overhead panel, for example, may be avoided.

Other and more particular objects of the invention will be apparent from a reading of the following description and an examination of the accompanying drawing.

A construction designed to carry out the invention will be hereinafter described, together with other features of the invention.

The invention will be more readily understood from a reading of the following specification and by reference to the accompanying drawing, wherein examples of the invention are shown, and wherein:

Fig. 1 is a view in perspective of a building constructed of panels mounted in accordance with this invention, Fig. 2 is an enlarged, transverse, sectional view illustrating the panels and their engagement with the mounting strips, Fig. 3 is an enlarged fragmentary view in elevation of one of the panel structures, Fig. 4 is a transverse, sectional view of a modified form of the panel unit, Fig. 5 is a transverse, sectional view illustrating the fabrication of one of the panels from cloth or fabric, Fig. 6 is a transverse, sectional view illustrating the fabrication of one of the panel units from screening or wire cloth, Fig. 7 is a transverse, sectional view illustrating the fabrication of a panel unit from metal or paper, Fig. 8 is a fragmentary, transverse, sectional view illustrating the fabrication of a cloth panel with the mounting bead loomed integrally of the cloth, and Fig. 9 is a fragmentary cross-sectional view of a modified form of the mounting strips having provision for mounting superposed membranes or panel units.

In the drawing, the numeral 10 designates a wide, thin panel or sheet of considerable length and formed of a pliable or flexible material. As shown in Figs. 2 and 4, the panel 10 may be formed of a suitable synthetic resin, or as shown in Figs. 5, 6, and 7, may be formed of fabric or cloth, wire cloth, paper, thin sheet metal, and the like. The fabric or wire cloth may be bare or impregnated with a suitable resinous material, such as a transparent or translucent resin so as to be porous or to be impervious to the passage of air and of water.

In the form of the invention shown in Fig. 2, the marginal edges of the panel 10 are doubled upon themselves and welded or cemented together as indicated at 11 to enclose a marginal and longitudinal bead element 12 which may also be formed of a synthetic resin, or more desirably, of rope or twine, or a more inexpensive material such as paper cording or twine, or paper crimped upon itself to form an elongate, rope-like, cylindrical member. Thus, the panel is provided with a bulbous, substantially incompressible marginal edge or mounting bead 12' of generally cylindrical shape or circular cross-section. Manifestly, it would be possible to form this enlarged portion of varying cross-sections, but it is more economical and convenient to form the enlarged section with a circular cross-section, and in the mounting and securing of the panels, it has been found critical for the distribution of stresses as well as the ready insertion of the panel sections into the mounting strips to be described hereinafter, that the panels be formed with cylindrical edge portions and that the mounting strip be correspondingly grooved for reception of such edge portions.

The mounting strips for the panels 10 are also desirably formed of synthetic resin or metal, but may be formed of wood or other suitable materials. Again, it has been found preferable if not critical that the strips be formed of metal to reduce flexibility and elasticity to a minimum, and yet to retain sufficient longitudinal or lengthwise flexibility as to permit the mounting strips to be conformed to irregular or uneven surfaces. The mounting strips 13 are formed with a central web portion 14 and longitudinal circular grooves 15 in each marginal or edge portion, the grooves 15 opening through narrow slots 16 to the side walls of the strips. The grooves 15 are of sufficient diameter as to have an easy sliding fit with the beads 12' formed upon each edge of the panels 10, and the slots 16 are of sufficient width that the portions of the panels 10 adjacent the beads 12' may readily be slipped thereinto.

In use, the mounting strips 13 are secured upon suitable building elements or units such as the joists or studs 17, being attached thereto by the nails 18, by screws or staples, or by any other suitable or desirable fastening elements.

In constructing a building or greenhouse 19, as shown in Fig. 1, a minimal framework (not shown) is erected and the mounting strips 13 properly secured to the studs and joists or rafters thereof. Thereafter, a suitable length of one of the panels 10 may be tautly and rigidly mounted between each adjacent pair of the rafters or studs by simple introduction of the end or terminal portions of the beads 12' into adjacent ones of the grooves 15, and the panel thereafter slid into position by longitudinal passage of the beads 12' lengthwise of the grooves 15. After positioning, the excess length of the panels is trimmed off and a complete wall panel or section is thus brought into place. Obviously, in the case of damage or the desirability of replacement of the panels with panels of different translucency or different colors, the damaged or old panel is readily removed in the same manner and a new panel substituted therefor with a minimum of time and labor, and by reason of the thin and inexpensive nature of the panels, with a minimum of cost.

Quite clearly, the mounting strips 13 may be fabricated with only a single one of the mounting grooves 15 for the holding of the edge portion of a single one of the panels 10, or the mounting strips may be fabricated, as shown, with a pair of opposed grooves for reception of the edge portions of a pair of adjacent panel sections.

As illustrated in Fig. 4, the panel sections may be extruded in a wide, thin form to constitute the central panel sections 20 and integral marginal beads 21 of cylindrical shape for reception in the grooves 15. The panel 20 may be formed with a central, longitudinal bead 22 of semi-cylindrical configuration for use in roof panels, or even in wall panels, to form a collection point or line for water condensation which may occur, the bead 22 functioning in the well known manner as a drip bead to which droplets of water may flow for adhesion and collection and ultimate drainage to a desired location.

Also, as shown in Figs. 5 and 6, the panels may be formed of fabric sheets 23 or wire cloth sheets 24, each having suitably secured in its marginal portion a cylindrical filler member 25 for forming upon the longitudinal and marginal edges of the panels, mounting beads 26 for reception in the mounting grooves 15. Further, as shown in Fig. 7, the panel units may be formed of wide, thin and long sheets 27 constituted of thin metal or paper, the edge portions of the panels being doubled upon themselves and suitably secured together to enclose cylindrical filler elements 28 forming marginal beads 29, again for reception in the mounting grooves 15. In the case of the fabric or wire cloth modifications, the doubled back edge portions which form the mounting beads may be stitched or otherwise secured together, the fabric or wire cloth may be loomed with an integral bead on its margins formed of a multiplicity of the fabric threads, or the wire cloth may be suitably rolled and doubled upon itself to form the cylindrical bead portions 26. The fabric and the wire cloth may be treated in various manners such as impregnation with mildew or rot resistant chemicals or by coating with various materials such as resins and rubber-like products, in the case of a fabric, or by galvanizing in the case of the wire cloth or impregnation with a suitable resin-like material of transparent or translucent or opaque properties to close the interstitial spaces of the wire cloth and to provide a substantially impervious barrier to air and moisture. Similarly, the metal or paper panel units of the modification of Fig. 7 may receive suitable protective coatings, or in the case of a paper panel, moisture resistant coatings or impregnations, various strengthening resins, and the like.

It is pointed out and emphasized that the substantially cylindrical configuration of the marginal mounting beads of the panel units, the cylindrical configuration of the bead-receiving grooves 15 of the mounting strips 13, and the narrowness of the slot 16, are all critical and essential for achieving optimum strength and durability. The mounting strips 13 being inflexible as far as the walls of the grooves 15 are concerned, the substantially complete encompassing of the mounting beads of the panels by the walls of the grooves 15 and the circular configuration of both the beads and the grooves, all result in a structure in which transverse stresses applied to the panels 15 by weather or wind, or by physical objects, are uniformly distributed throughout the entire length of both edges of the panel units whereby stresses tending to create local tearing or ripping of the panels at isolated fastening points are avoided, and it is made possible to provide a durable building structure formed of very thin and flexible, and normally rather fragile material such as the thin plastic sheets 10. In addition, the cylindrical configuration of the mounting beads and grooves brings to a minimum any tendency for the beads to wedge within the grooves, the ease of slipping the panels into position within the grooves 15 is greatly increased, and the transverse destructive stresses applied through the panels 10 to the mounting beads is uniformly distributed so as to reduce so far as possible, any tendency of the mounting beads toward failure or destruction. Also, the relatively close fit of the mounting beads 12' within the grooves 15, and the narrowness of the slots or openings 16, enhances the weather-tightness of the structure, and further, any stresses applied to the panels 10 only further tighten the engagement of the mounting beads with the portions of the grooves adjacent the slots 16 to increase the weather-tightness under windy or other adverse conditions. The cloth panel 23 illustrated in Fig. 5 may be modified to include a cloth panel 23' having marginal bead portions 30 of cylindrical configuration loomed directly into the cloth panel so as to form an integral portion thereof. By means of this structure, the production of cloth panels is greatly facilitated and rendered less expensive through automatic looming operations that are well known in the textile art.

Further, as shown in Fig. 9, a modified form of mounting strip 31 may be utilized for affixing to the stud or other support 17, each lateral face of the strip 31 carrying a pair of spaced, parallel, bead-receiving grooves 32, similar to the grooves 15, the grooves 32 having narrow slots or lateral openings 33 and being adapted to receive a pair of spaced membranes or panel units 34, which may be of any of the types described herein. The utilization of a pair of spaced panels to form the wall or roof structure will, of course, incorporate a dead air space in the panel unit for insulation against both heat and cold, whereby fuel costs and expense is minimized, along with condensation, and whereby more effective control of heat received from sunshine or heat lost to windy or other weather conditions may be more readily regulated.

The foregoing description of the invention is explanatory thereof and various changes in the size, shape and materials, as well as in the details of the illustrated construction may be made within the scope of the appended claim, without departing from the spirit of the invention.

What I claim and desire to secure by Letters Patent is:

A composite building structure including, a plurality of pairs of wide thin flexible panels arranged in spaced parallel relationship in a pair of spaced parallel planes, bead portions of cylindrical form on each longitudinal edge of each panel, and mounting strips between adjacent pairs of panels, each mounting strip having a wide web portion carrying and spacing apart opposed pairs of spaced parallel elongate cylindrical grooves in the opposed edge portions of the web portion in which the bead portions of the pairs of panels having sliding fits, the web portion spacing the opposed pairs of cylindrical grooves apart a distance sufficient to permit the passage of fastening elements transversely through the web portion between the opposed pairs of cylindrical grooves, each groove having a slot opening from the groove through the wall of the mounting strip, the slots having a width less than the diameter of the grooves, each pair of slots opening from the grooves in directions spaced 180° from the opposite pair of slots, the web portion and opposed edge portions of the web portion of each mounting strip having a flat continuous external face in common whereby the mounting strip may be abutted against a flat supporting surface with substantially continuous contact between the external face of the strip and the supporting surface.

References Cited in the file of this patent

UNITED STATES PATENTS

| | | |
|---|---|---|
| 1,713,302 | Schemmel | May 14, 1929 |
| 2,008,176 | Fritsche | July 16, 1935 |
| 2,299,382 | Creasy | Oct. 20, 1942 |
| 2,797,696 | Fritsche | July 2, 1957 |
| 2,808,065 | Ellis | Oct. 1, 1957 |
| 2,828,756 | Worley | Apr. 1, 1958 |